United States Patent [19]

Lee et al.

[11]  4,280,127
[45]  Jul. 21, 1981

[54] RANGE SWATH COVERAGE METHOD FOR SYNTHETIC APERTURE RADAR

[75] Inventors: Henry E. Lee, Columbia; Francisco J. Guillen; R. Noel Longuemare, Jr., both of Ellicott City, all of Md.

[73] Assignee: Westinghouse Electric Corp., Pittsburgh, Pa.

[21] Appl. No.: 60,514

[22] Filed: Jul. 25, 1979

[51] Int. Cl.$^3$ ............................................. G01S 13/90
[52] U.S. Cl. .................................................. 343/5 CM
[58] Field of Search ...................................... 343/5 CM

[56] References Cited

U.S. PATENT DOCUMENTS

| 3,007,155 | 10/1961 | Petrides | 343/5 CM |
| 3,178,711 | 4/1965 | Case, Jr. | 343/5 CM |
| 3,662,384 | 5/1972 | Albert | 343/5 CM |
| 3,696,432 | 10/1972 | Anderson et al. | 343/5 CM |
| 3,790,939 | 2/1974 | Constant | 343/5 CM |
| 3,879,729 | 4/1975 | Nevin | 343/5 CM |
| 3,909,829 | 9/1975 | Daly | 343/5 CM |
| 3,992,707 | 11/1976 | Schmidtlein et al. | 343/5 CM |
| 4,028,708 | 6/1977 | Woodward | 343/5 CM |
| 4,028,710 | 6/1977 | Evans | 343/5 CM |
| 4,064,510 | 12/1977 | Chabah | 343/5 CM |
| 4,086,590 | 4/1978 | Goggins, Jr. | 343/5 CM |
| 4,134,113 | 1/1979 | Powell | 343/5 CM |

OTHER PUBLICATIONS

John C. Kirk, Jr.; Motion Compensation for Synthetic Aperture Radar; IEEE Trans. Aerospace & Electronic Systems, vol. AES -11, May 1975, pp. 338-348.

Primary Examiner—T. H. Tubbesing
Attorney, Agent, or Firm—H. W. Patterson

[57] ABSTRACT

A synthetic aperture radar antenna, which is mechanically scanned through the squint mode, is operated to a selected roll angle to optimize the alignment of the antenna beam axis or isogain line, and the line of constant doppler frequency or isodop line. The roll angle is selected as a function of the angular position of the antenna in azimuth and elevation.

2 Claims, 7 Drawing Figures 4,280,127

RANGE SWATH COVERAGE METHOD FOR SYNTHETIC APERTURE RADAR

BACKGROUND OF THE INVENTION

1. Field of the Invention

The present invention relates to radar systems; and more particularly to synthetic aperture radar antenna systems.

2. Description of the Prior Art

Synthetic aperture radar is based upon the synthesis of an effectively long antenna array that is created by the motion of the radar platform in a relatively straight path at a constant velocity. As the aircraft carrying the radar platform moves along its flight path, a single antenna of relatively small dimension transmits repetitive pulses. The reflected pulses or echoes are sensed and stored in a memory device until a predetermined number of echoes have been received to achieve the desired resolution. The signals stored in such memory device are somewhat similar to the signals that would have been received by a conventional linear array of antenna elements arranged along the flight path. Such systems are particularly advantageous in mapping ground areas from a flight platform. Depending upon the particular application, the antenna element which may be conveniently located in the nose of the aircraft may be pointed in the direction of flight to illuminate a section of ground area directly ahead of the moving aircraft (0°), are directed to a position orthogonal to the flight path to illuminate an area to the side of the aircraft (90°), are directed to a position to illuminate an area between the dead ahead and side looking positions, which is sometimes referred to as the squint mode of operation (0°–90°).

As the aircraft travels, the area that is effectively mapped takes the form of a path. The width of this path, which is referred to as a range swath determines the limits of the ground area coverage. The actual width of such path depends on both the angle of the antenna in elevation, referred to as the depression angle, and the angle of the antenna in azimuth (0°–90°) relative to the direction of aircraft travel. At large depression angles, and small angles in azimuth, the range swath coverage becomes quite narrow.

For some applications, the radar antenna may be mechanically scanned in azimuth to scan the ground area from the dead ahead position through the squint mode to the side looking or orthogonal position as the aircraft is travelling along its flight path. In addition to scanning in azimuth, the depression angle may be varied to select the distance or range of the area being mapped from the aircraft. Such angle, of course, determines the deviation in range of the ground area from the actual altitude of the aircraft. As such scanning occurs, the range swath coverage decreases as the angle in azimuth changes from 90° to the dead ahead position.

The limits of such range swath are determined by the line of constant doppler frequency shift or isodop line. Mapping, of course, occurs along the boresight of the antenna, which is referred to as the isogain line. Thus to obtain an image without distortion, the echoes of a predetermined doppler frequency shift are filtered prior to utilization.

Heretofore, in order to maintain an optimum range swath coverage for a system that operates in a squint mode or scans through such squint mode, the reflected signals were processed in a manner which is sometimes referred to as range dependent processing. Such processing involves continually shifting the reference frequency as the isogain line or antenna boresight relative to the direction of the aircraft shifts; or in other words, a different frequency is utilized depending upon the actual range.

SUMMARY OF THE INVENTION

In accordance with the present invention, there is provided an improved method for increasing the range swath of a synthetic aperture radar, which method comprises rolling the antenna about an axis which is orthogonal to the azimuth and elevation axes to a selected angle to more closely align the isogain and isodop lines; and more specifically to roll the antenna by an amount which is a function of the antenna azimuth and elevation angle to obtain optimum alignment of such isogain and isodop lines.

IN THE DRAWINGS

DESCRIPTION OF THE PREFERRED EMBODIMENT

Figure 1:
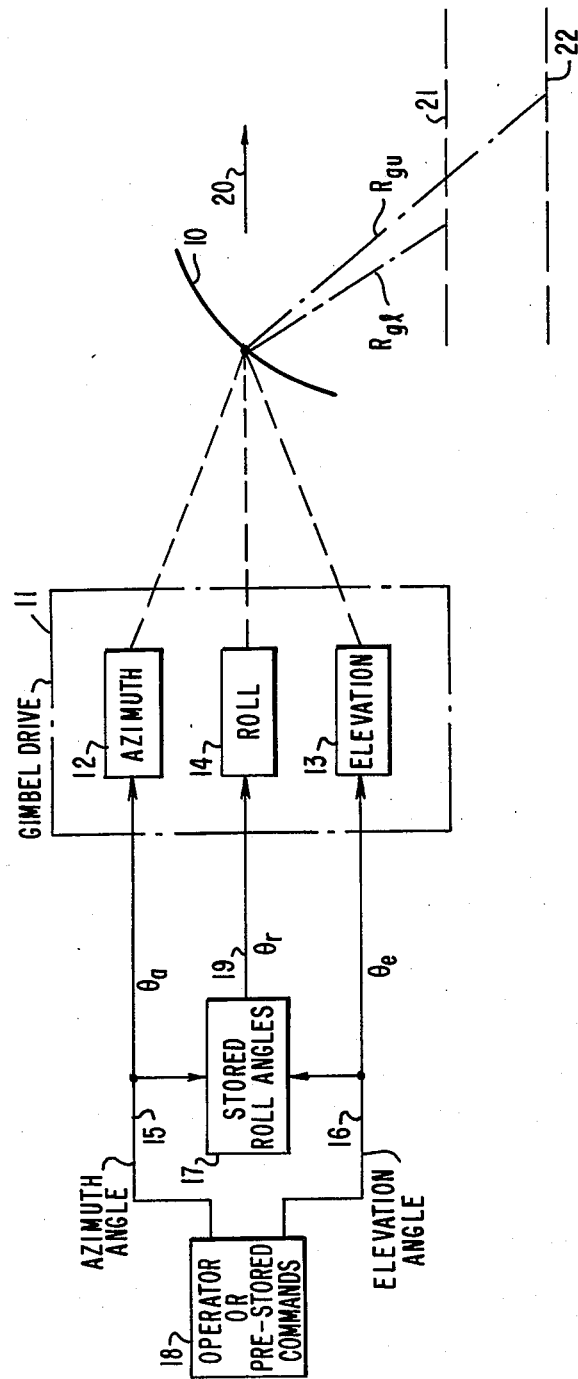
FIG. 1 is a block diagram illustrating a system for practicing the method of the present invention.

Referring to FIG. 1, a general block diagram of a system that may be utilized in practicing the present invention is illustrated. An antenna 10, which may be conventionally mounted in the nose of an aircraft, for example, is pointed in a conventional manner by a gimbal drive mechanism generally referred to within dash lines 11. The gimbal drive mechanism 11 includes an azimuth drive generally referred to at 12, an elevation drive generally referred to at 13 for pointing the antenna at various angles in azimuth and elevation respectively. A roll angle drive referred to at 14 is utilized to roll the antenna a selected number of degrees about an axis which is orthogonal to the azimuth and elevation axes, in accordance with the present invention. The gimbal drive mechanism 11 may be operated in a conventional manner by an operator manually or by prestored commands, the function of which is illustrated by block 18. Such commands are output over a line such as 15 to operate the azimuth drive 12 and over a line 16 to operate the elevation drive 13. Additionally, signals for selecting the azimuth and elevation angles are input to any well known function for selecting the optimum roll angle which is stored in any well known conventional manner as represented by block 17 to select the roll angle depending upon the selected angles in azimuth and elevation. Such stored angle control is output over line 19 to operate the roll gimbal in accordance therewith. Once the method of the present invention is described herein, the system and apparatus for carrying out such method is well known and is believed not to require any more detailed explanation. Assuming that the antenna 10 is mounted in the nose of an aircraft travelling in the direction of an arrow 20, for example, an area situated between dash lines 21 and 22, respectively may be illuminated by the antenna. The distance between such boundaries 21 and 22 is referred to as the width or range swath of the illuminated area. This swath is determined by the upper and lower limits of the ground range that is capable of reflecting echoes to be received by the antenna 10 without distortion. The upper limit of ground range referred to as $R_{gu}$ herein corresponds to the distance along the similarly referenced line. The lower limit of ground range referred to as $R_{gl}$ corresponds to the similarly referenced line. The difference in the lengths of the lines $R_{gu}$ and $R_{gl}$ or the ground range limits determines the range swath coverage or width of the mapping area.

Figure 2:
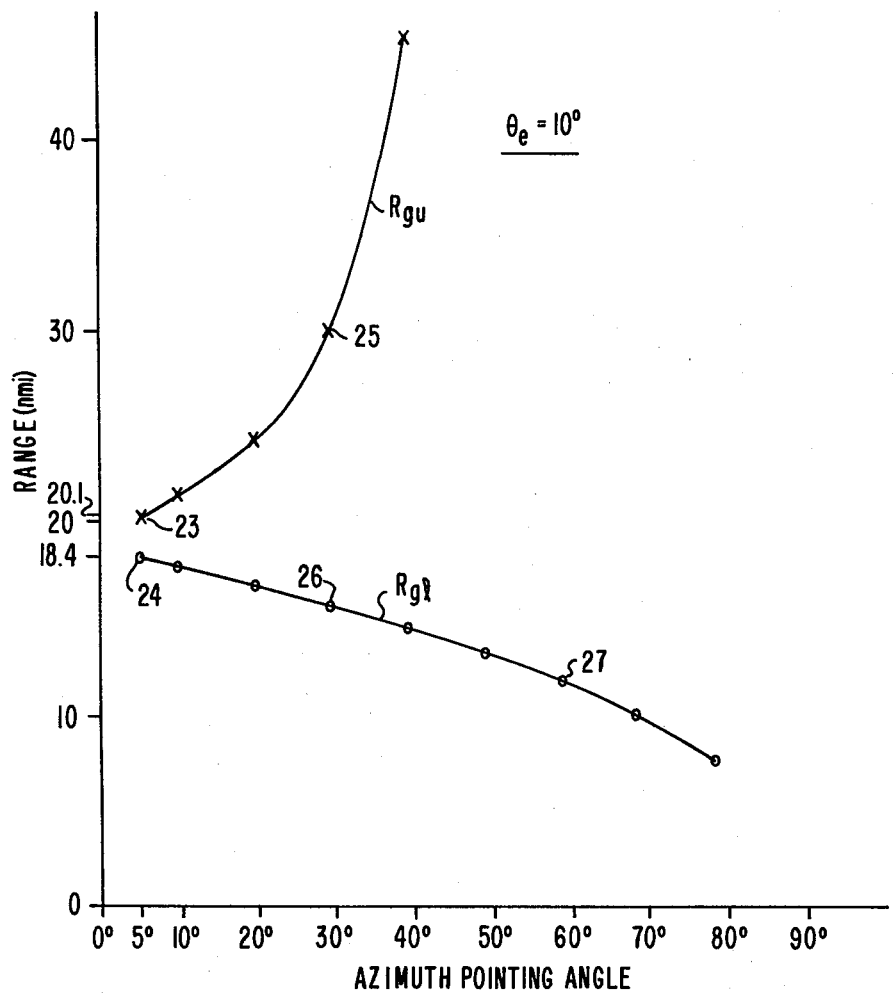
FIG. 2 is a graph illustrating for a selected elevation angle, the upper and lower limits of ground range for a synthetic aperture radar as a function of azimuth pointing angle without the benefit of the method of the present invention.

Referring to FIG. 2, the values of $R_{gl}$ and $R_{gu}$ are graphically illustrated as a function of azimuth angle of the antenna for a given aircraft altitude of 20,000 feet and an elevation angle of 10°, for example. Assuming that the azimuth pointing angle of the antenna is 5°, then the upper limit of range is approximately 20.1 nautical miles as noted by point 23 and the lower range limit is approximately 18.4 nautical miles as noted by point 24. Thus, the range swath coverage for such as azimuth angle is approximately 1.7 nautical miles. As the azimuth pointing angle increases to 30°, for example, then the upper range limit is approximately 30 nautical miles as noted by point 25 and the lower range limit is approximately 17.5 nautical miles, providing a range swath of 7.5 nautical miles. As the antenna moves toward a position normal to the path of the aircraft, to an angle of 60°, for example, the lower range limit is approximately 12 nautical miles as noted by point 27 and the upper range limit approaches infinity.

Figure 3:
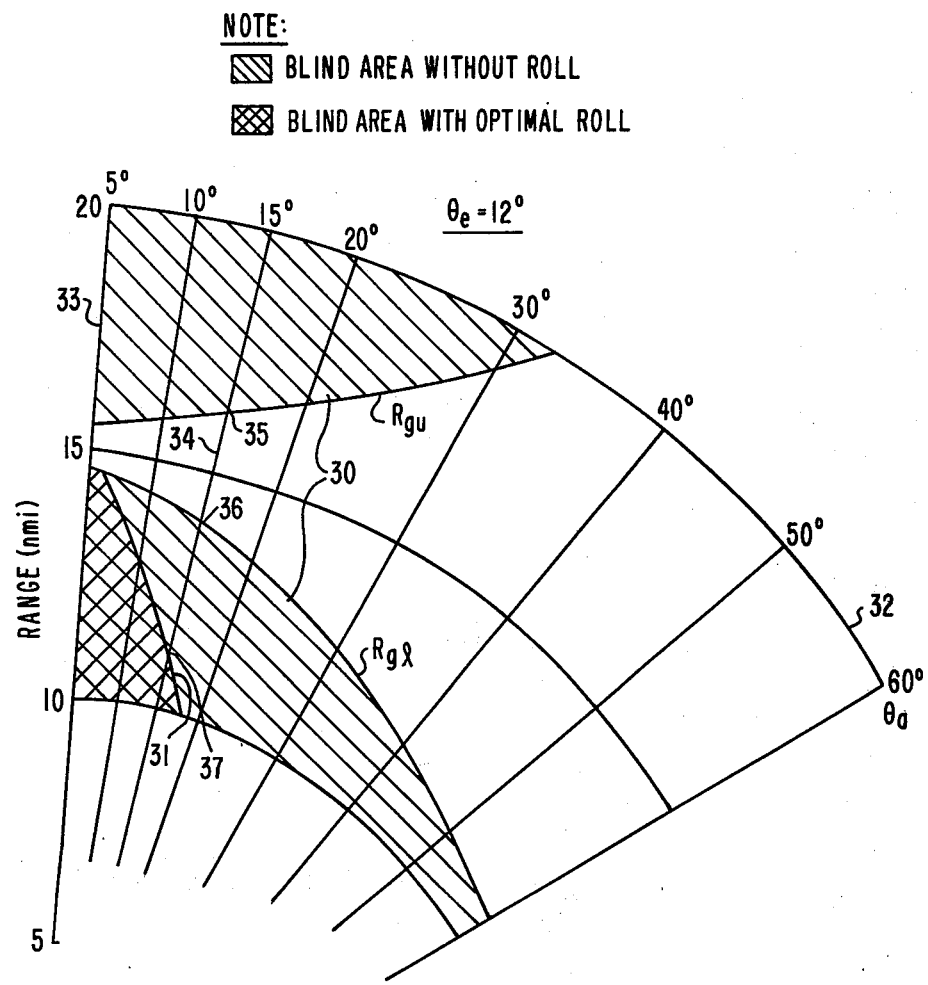
FIG. 3 illustrates graphically the range coverage as a function of azimuth angle of the antenna of the synthetic aperture radar showing the blind areas both with and without the benefit of the present invention.

In accordance with the present invention, the range swath coverage is significantly increased by rolling the antenna to an optimum angle for closely aligning the isodop and isogain lines. In FIG. 3, the portion of the diagram that is hatched with parallel lines, referred to generally by the reference numeral 30, represents the blind area or reduction in range swath, without the benefit of the method of the present invention; or in other words without rolling the antenna. That portion of the diagram that is cross-hatched referred to by the reference numeral 31 represents the blind area that is existent with the benefit of the present invention. The diagram assumes an elevation angle of the antenna of approximately 12° with the angles in azimuth extending from 5° to 60° as indicated on line 32 for a range in nautical miles that extends from 5 to 20 as indicated along line 33. For example, assume that the antenna angle in azimuth is 5° the ground range lower limit is approximately 13½ nautical miles as shown on the diagram either with or without the benefit of the method of the present invention. However, if the antenna azimuth angle is 15° represented by the approximate radial line 34, without the benefit of the invention the upper ground range is approximately 16 nautical miles as noted as point 35 and the lower ground range limit is approximately 14 nautical miles as shown by point 36 which provides a range swath of approximately 2 nautical miles. With the benefit of the present invention the blind area is reduced so that the lower ground range limit is approximately 11 nautical miles as noted by point 37 which increases the lower ground range limit by approximately 3 nautical miles to improve the range swath. As seen from the diagram of FIG. 3, as the antenna angle and azimuth increases, the blind areas become less and less significant. It is to be understood that the range swath changes inversely with the elevation pointing angle.

Figure 4:
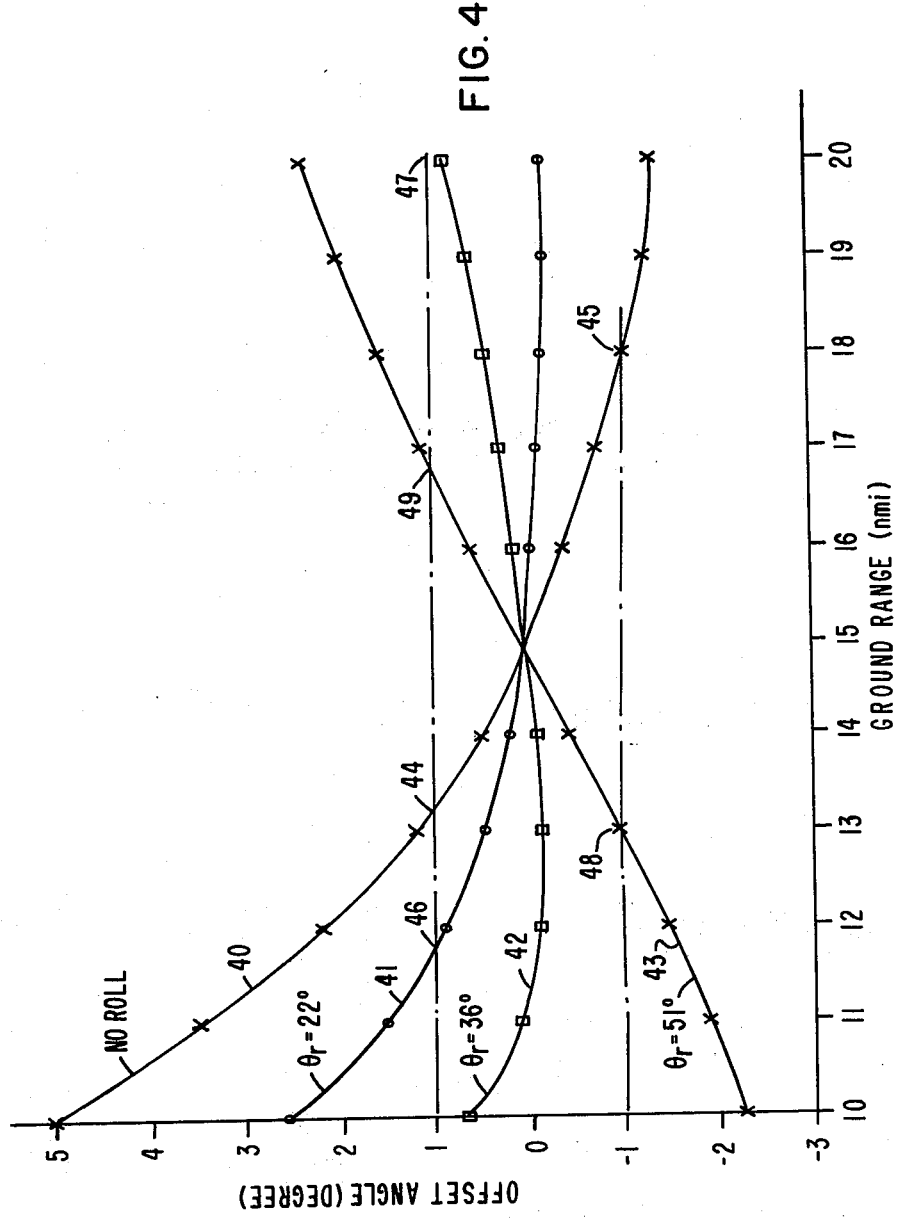
FIG. 4 illustrates graphically the resulting upper and lower limits of range swath for selected degrees of antenna roll as a function of the angle between the isodop and isogain lines in accordance with the method of the present invention.

Referring to FIG. 4, a graph of the ground range as a function of the offset angle in degrees is illustrated. The offset angle referred to herein is that angle between the isodop line and the isogain line. It is assumed, that the amount of offset angle that can be tolerated is approximately 25% of the beam width. For example, for a 4° beam width a maximum offset angle of 1° is the limit. As the beam width gets larger, the rolling requirement of the antenna becomes less.

Referring to FIG. 4 a graphical illustration is presented for an antenna having an altitude of 20,000 feet with an azimuth angle of 20°. Line 40 represents the offset angle of an antenna that is not rolled as a function of ground range. Line 41 represents the offset angle as a function of ground range when the antenna is rolled 22° from normal. Line 42 represents the offset angle in degrees as a function of ground range when the antenna is rolled 36° from normal; and line 43 represents the offset angle as a function of ground range when the antenna is rolled 51° from normal. Assuming that the beam width is approximately 4°, and recalling that the tolerable offset angle is 25% of such beam width then the lower range limit $R_{gl}$ is slightly more than 13 nautical miles as noted by point 44 and the upper ground range limit is approximately 18 nautical miles as indicated as point 45. When the antenna is rolled 22°, the ground range lower limit is approximately 12 nautical miles as indicated by point 46 of line 41 and the upper range limit approaches infinity because the minus 1° does not intersect the line 41 when extended in a horizontal direction as seen from the diagram of FIG. 4. Similarly, in the event the antenna is rolled 36° the offset angle is reduced such that the upper ground range limit is approximately 20 nautical miles as indicated by point 47 of the diagram. In the event that the antenna is rolled 51°, then the lower ground range limit is approximately 13 nautical miles as indicated by point 48 and the upper range limit is approximately 16½ nautical miles as indicated by point 49. Thus, for an altitude of 20,000 feet with the antenna angle in 20° azimuth, the widest range swath could be obtained by rolling the angle 36°.

Figure 5:
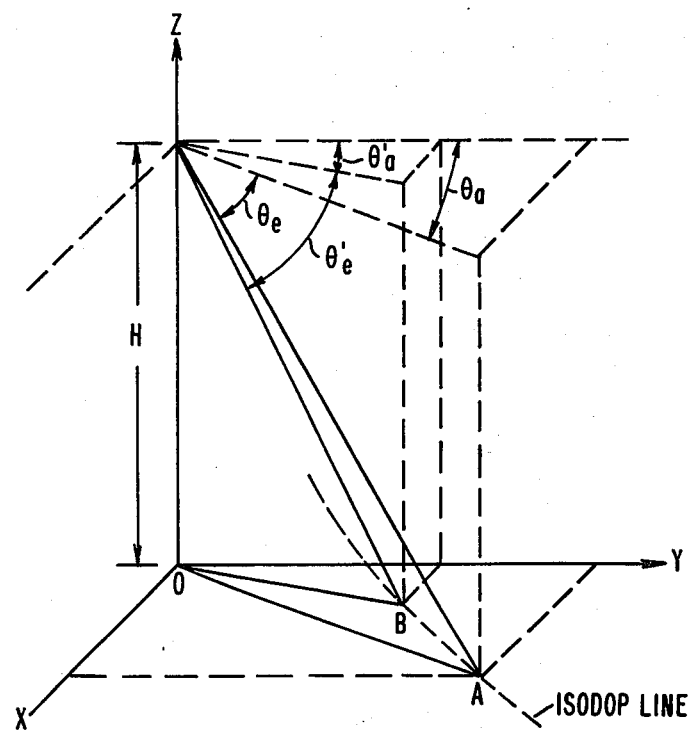
FIG. 5 is an illustration of the mapping geometry of a synthetic aperture radar in order to better understand the principles involved in obtaining the optimum antenna roll angle in accordance with the present invention.
Figure 6:
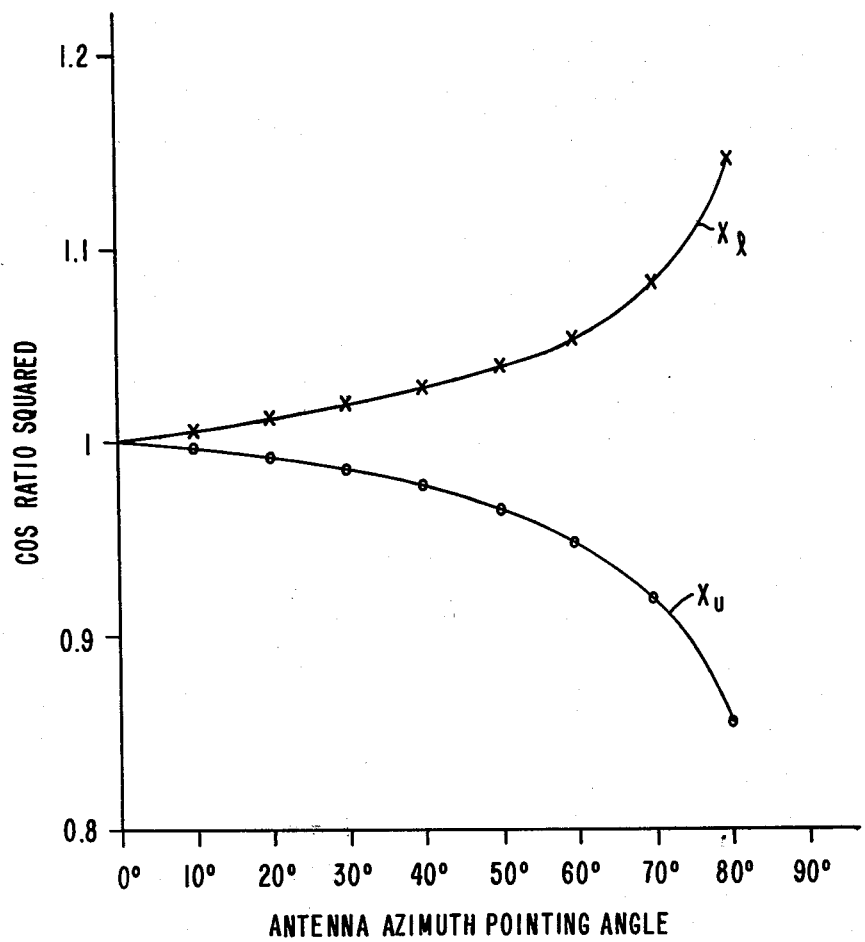
FIG. 6 is a graph of the values of the cosine ratio squared for the upper and lower limits as an intermediate step in determining the optimum antenna roll angle.
Figure 7:
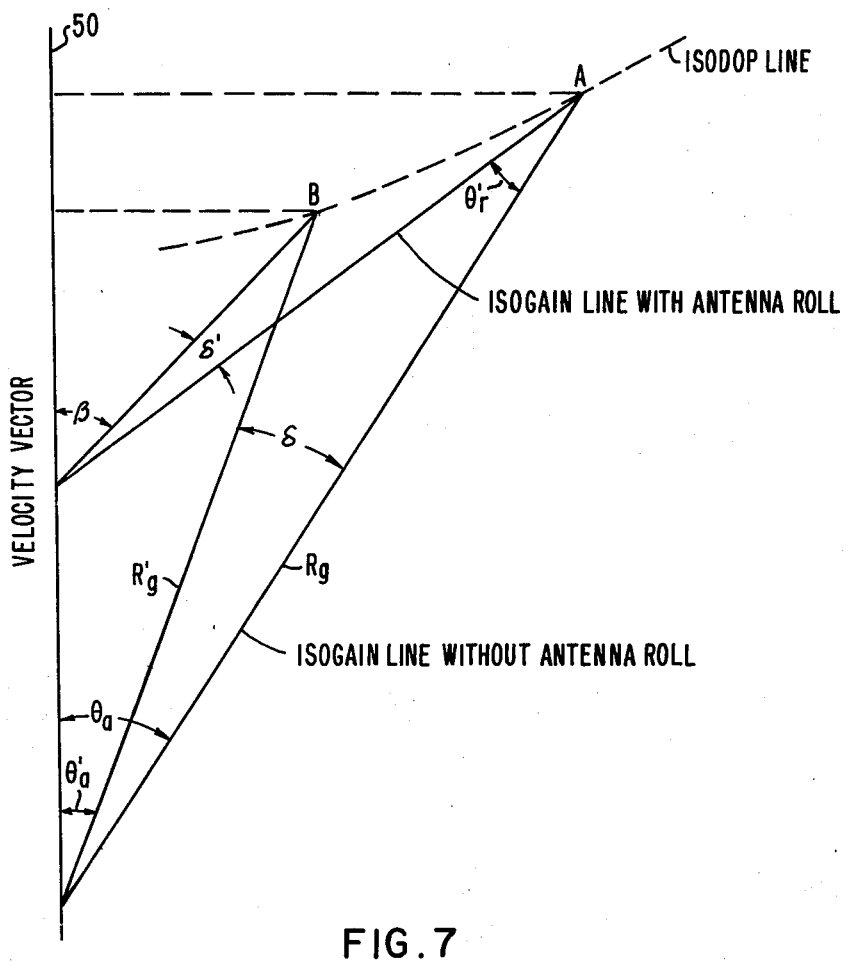
FIG. 7 illustrates the ground plane mapping geometry involved in order to better understand the principles in determining the optimum roll angle.

In describing optimum roll angles for other antenna angles in azimuth and elevation at other altitudes, reference is made to FIGS. 5, 6 and 7 herein. Referring to FIG. 5, the doppler frequency $f_d$ of the echo from a ground point referred to as A is, neglecting vertical velocity, $$f_d = (2v_h/\lambda) \cos \theta_a \cos \theta_e \quad (1)$$

where $\theta_a$ and $\theta_e$ are the azimuth and elevation angles of such ground point A with respect to the antenna position. $\theta_a'$ and $\theta_e'$ are the azimuth and elevation angles respectively of a second point on the ground referred to as B. If point B lies on the isodop line passing through point A, $$\cos\theta_a' \cos\theta_e' = \cos\theta_a \cos\theta_e \qquad (2)$$

The above equation (2) can be transformed into $$\frac{1 + \tan^2\theta_e}{\sec^2\theta_e} = \left(\frac{\cos\theta_a'}{\cos\theta_a}\right)^2 \qquad (3)$$

Utilizing equation (3), the ground range coverage limits $R_{gl}$ and $R_{gu}$ are found to be $$R_{gl} = H(X_l \sec^2\theta_{eo} - 1)^{-\frac{1}{2}} \qquad (4)$$

and $$R_{gu} = H(X_u \sec^2\theta_{eo} - 1)^{-\frac{1}{2}} \qquad (5)$$

where $$X_l = \left[\frac{\cos(\theta_{ao} - \Delta\theta_a)}{\cos\theta_{ao}}\right]^2 \text{ and } X_u = \left[\frac{\cos(\theta_{ao} + \Delta\theta_a)}{\cos\theta_{ao}}\right]^2$$

The aircraft altitude in the above equations is referred to as H and the antenna pointing angles are $\theta_{ao}$ in azimuth and $\theta_{eo}$ in elevation. The term $\Delta\theta_a$ is normally chosen to be $\frac{1}{4}$ of the antenna azimuth beam width ($\beta_a$).

Referring to FIG. 6, the values of $X_l$ and $X_u$ which are the lower and upper limit cosine ratio squared are determined as a function of antenna azimuth pointing angle $\theta_{ao}$ with an assumed beam width of 3°, for example. As evidenced from the curves $X_l$ and $X_u$, respectively, the value of $X_l$ increases and that of $X_u$ decreases exponentially with increasing azimuth angle. It is then determined from equations (4) and (5) that the range coverage given by the difference between $R_{gl}$ and $R_{gu}$ decreases with decreasing antenna azimuth pointing angle for a given aircraft altitude H and antenna elevation angle. It is understood, that the map range coverage is a linear function of aircraft altitude. Also, it is to be noted that the range swath changes inversely with the elevation pointing angle where 0° in elevation is horizontal to the ground plane.

Referring to FIG. 7, the ground plane geometry illustrated therein is utilized in evaluating the reduction in blind area due to the rolling of the antenna in accordance with the present invention. The offset angle which is $\delta'$ is that angle between the isodop line and the isogain line with antenna roll is determined in accordance with the following equation $$\delta' = \theta_a + \theta_r' - \beta \qquad (6)$$

where $\theta_a$ is the antenna azimuth pointing angle, and $\theta_r'$ is the roll angle of the isogain line. The angle $\beta$ of FIG. 7 is obtained in accordance with the following equation $$\beta = \tan^{-1}\left[\frac{R_g' \sin\theta_a'}{R_g' \cos\theta_a' - R_g \cos\theta_a + R_g \sin\theta_a/\tan(\theta_a + \theta_r')}\right] \qquad (7)$$

From FIG. 7 it is to be noted that in the absence of antenna roll the isogain line roll angle $\theta_r' = 0$ and the equation (7) is reduced such that the angle $\beta$ is equal to the angle $\theta_a'$. Line 50 represents the velocity vector. The antenna roll angle $\theta_r$, which is related to the isogain line roll angle $\theta_r'$, can be obtained by the following equation $$\theta_r = \tan^{-1}(\tan\theta_r'/\sin\theta_e) \qquad (8)$$

When the antenna is rolled in accordance with the present invention, the offset angle is decreased from $\delta$ to $\delta'$ so that both points A and B are included in the range swath.

We claim:

1. A method of increasing the range swath coverage in an airborne synthetic aperture radar antenna that is operated by a gimbal drive mechanism to position the antenna about axes in elevation and azimuth and to position the antenna about a roll axis that is orthogonal to both the elevation and azimuth axes, said antenna being configured to project a beam that changes the area of illumination in accordance with its angular position about the roll axis, comprising positioning the antenna about the roll axis a selected angle effective to more closely align the isogain line and the isodop line.

2. A method according to claim 1 wherein the selected roll angle about the roll axis is determined as a function of the antenna pointing angle both in azimuth and elevation.

* * * * *